United States Patent
Chai et al.

(10) Patent No.: US 8,643,579 B2
(45) Date of Patent: Feb. 4, 2014

(54) ARRAY SUBSTRATE, DISPLAY PANEL AND DISPLAY DEVICE HAVING THE SAME, AND METHOD THEREOF

(75) Inventors: Chong-Chul Chai, Seoul (KR); Seong-Sik Shin, Seongnam-si (KR); Joo-Ae Youn, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 1720 days.

(21) Appl. No.: 11/623,406

(22) Filed: Jan. 16, 2007

(65) Prior Publication Data

US 2007/0165150 A1 Jul. 19, 2007

(30) Foreign Application Priority Data

Jan. 19, 2006 (KR) .......................... 10-2006-0005713

(51) Int. Cl.
*G09G 3/34* (2006.01)

(52) U.S. Cl.
USPC ............................................ 345/92; 345/102

(58) Field of Classification Search
None
See application file for complete search history.

(56) References Cited

U.S. PATENT DOCUMENTS

| 4,890,097 | A | * | 12/1989 | Yamashita et al. | 345/93 |
| 4,995,703 | A | * | 2/1991 | Noguchi | 349/54 |
| 5,303,072 | A | * | 4/1994 | Takeda et al. | 349/48 |
| 6,809,719 | B2 | * | 10/2004 | Wu et al. | 345/103 |
| 2006/0187180 | A1 | * | 8/2006 | Park et al. | 345/102 |

FOREIGN PATENT DOCUMENTS

JP 2005-338485 * 8/2005

* cited by examiner

*Primary Examiner* — Joseph Haley
(74) *Attorney, Agent, or Firm* — Cantor Colburn LLP

(57) ABSTRACT

An array substrate includes a gate line, a data line, a pixel electrode, a first thin film transistor, and a second thin film transistor. The gate line includes a plurality of sub lines receiving a gate signal. The data line crosses the gate line. The pixel electrode is between adjacent sub lines. The first thin film transistor is electrically connected to a first sub line of the adjacent sub lines, the pixel electrode, and the data line. The second thin film transistor is electrically connected to a second sub line of the adjacent sub lines, the pixel electrode, and the data line. Therefore, an image display quality is improved.

23 Claims, 9 Drawing Sheets

ARRAY SUBSTRATE, DISPLAY PANEL AND DISPLAY DEVICE HAVING THE SAME, AND METHOD THEREOF

This application claims priority to Korean Patent Application No. 2006-05713, filed on Jan. 19, 2006 and all the benefits accruing therefrom under 35 U.S.C. §119, and the contents of which in its entirety are herein incorporated by reference.

BACKGROUND OF THE INVENTION

1. Field of the Invention

The present invention relates to an array substrate, a display panel having the array substrate, a display device having the array substrate, and a method thereof. More particularly, the present invention relates to an array substrate capable of improving an image display quality, a display panel having the array substrate, a display device having the array substrate, and a method of improving the display quality of a display device.

2. Description of the Related Art

A liquid crystal display ("LCD") device that is a flat panel display device, in general, includes an LCD panel and a backlight assembly. The LCD panel displays an image by using light transmittance of liquid crystals. The backlight assembly is under the LCD panel to supply the LCD panel with light.

The LCD panel includes a first substrate, a second substrate, and a liquid crystal layer. The first substrate includes a plurality of pixel electrodes and a plurality of thin film transistors electrically connected to the pixel electrodes. The second substrate includes a common electrode and a plurality of color filters corresponding to the thin film transistors and pixel electrodes. The liquid crystal layer is interposed between the first and second substrates.

The LCD panel includes a plurality of pixels. Each of the pixels includes red, green, and blue sub regions. Each of the pixel electrodes and each of the color filters are disposed in each of the sub regions. The color filters include red, green, and blue color filters.

An LCD device without the color filter has been devised to increase an opening rate. The LCD device without the color filter has a pixel electrode having an increased area. However, when the area of the pixel electrode is increased, a charging rate of the pixel electrode is decreased, thereby deteriorating an image display quality.

BRIEF SUMMARY OF THE INVENTION

The present invention provides an array substrate capable of improving an image display quality.

The present invention also provides a display panel having the above-mentioned array substrate.

The present invention also provides a display device having the above-mentioned array substrate.

The present invention also provides a method of improving an image display quality of the display device.

An array substrate in accordance with exemplary embodiments of the present invention includes a gate line, a data line, a pixel electrode, a first thin film transistor, and a second thin film transistor.

The gate line includes a plurality of sub lines that receive a gate signal. The data line crosses the gate line. The pixel electrode is interposed between two adjacent sub lines (a first sub line and a second sub line that is adjacent to the first sub line) of the gate line. The first thin film transistor is electrically connected to the first sub line, the pixel electrode, and the data line. The second thin film transistor is electrically connected to the second sub line, the pixel electrode, and the data line.

A display panel in accordance with other exemplary embodiments of the present invention includes a first substrate, a second substrate facing the first substrate, and a liquid crystal layer. The second substrate includes a common electrode. The liquid crystal layer includes liquid crystals interposed between the first and second substrates.

The first substrate includes a gate line, a data line, a pixel electrode, a first thin film transistor, and a second thin film transistor. The gate line includes a plurality of sub lines receiving a gate signal. The data line crosses the gate line. The pixel electrode is between adjacent sub lines. The first thin film transistor is electrically connected to a first sub line of the adjacent sub lines and the pixel electrode. The second thin film transistor is electrically connected to a second sub line of the adjacent sub lines and the pixel electrode.

A display device in accordance with still other exemplary embodiments of the present invention includes a display panel and a backlight assembly.

The display panel includes a first substrate, a second substrate facing the first substrate, and a liquid crystal layer including liquid crystals interposed between the first and second substrates. The backlight assembly is under the display panel and supplies the display panel with light.

The first substrate includes a gate line, a data line, a pixel electrode, a first thin film transistor, and a second thin film transistor. The gate line includes a plurality of sub lines receiving a gate signal. The data line crosses the gate line. The pixel electrode is between adjacent sub lines. The first thin film transistor is electrically connected to a first sub line of the adjacent sub lines and the pixel electrode. The second thin film transistor is electrically connected to a second sub line of the adjacent sub lines and the pixel electrode.

A method of improving an image display quality of a display device in accordance with exemplary embodiments of the present invention includes providing a gate line with first and second sub lines electrically connected to each other, crossing the first and second sub lines with a data line, providing a pixel electrode between the first and second sub lines, electrically connecting a first thin film transistor to the first sub line, the pixel electrode, and the data line, electrically connecting a second thin film transistor to the second sub line, the pixel electrode, and the data line, applying a gate signal to the first and second sub lines to simultaneously turn on the first and second thin film transistors, applying a data signal to the data line, and charging the pixel electrode simultaneously with the first and second thin film transistors.

According to the present invention, the first and second thin film transistors simultaneously drive the single pixel electrode to charge the pixel electrode. Thus, a charging rate of the pixel electrode is increased so that an image display quality is improved.

BRIEF DESCRIPTION OF THE DRAWINGS

The above and other features and advantages of the present invention will become more apparent by describing in detail exemplary embodiments thereof with reference to the accompanying drawings, in which.

Figure 3:
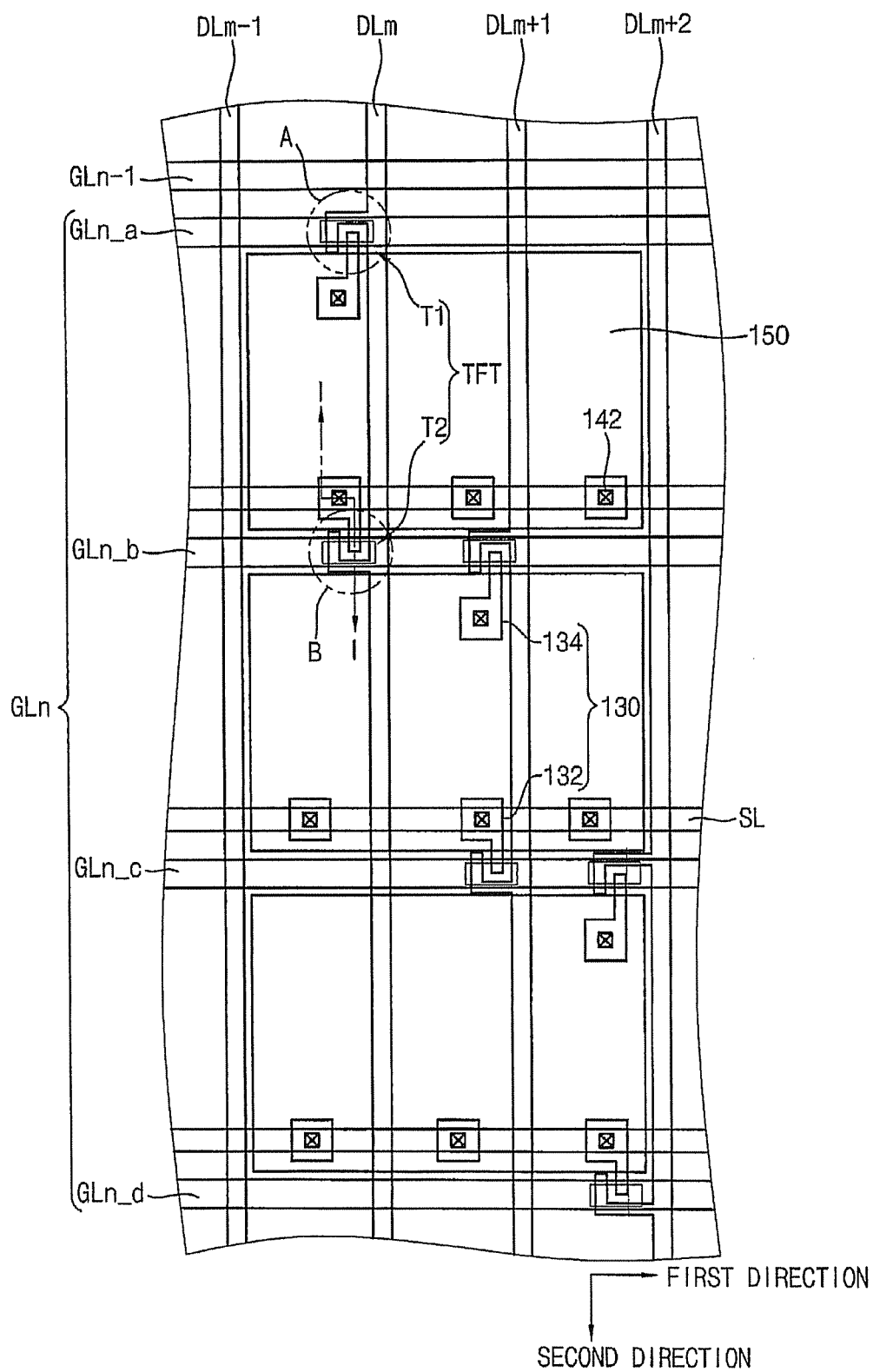
FIG. 3 is a plan view illustrating the exemplary array substrate shown in FIG. 1.
Figure 4:
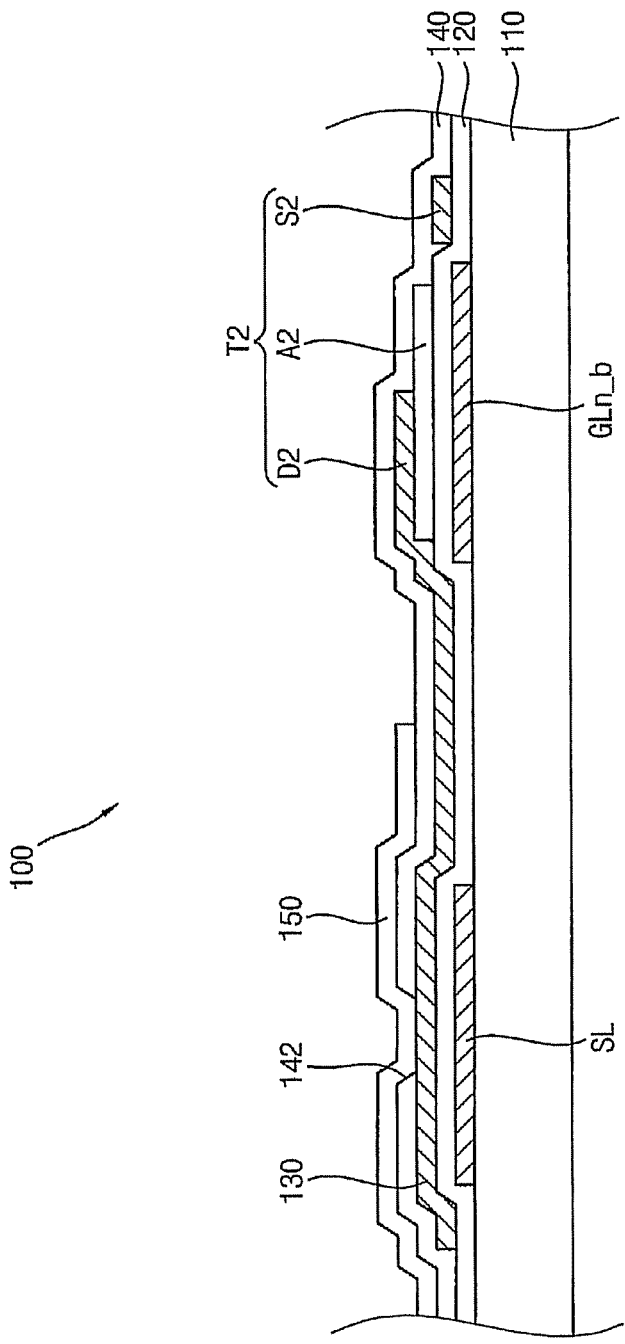
Figure 5A:
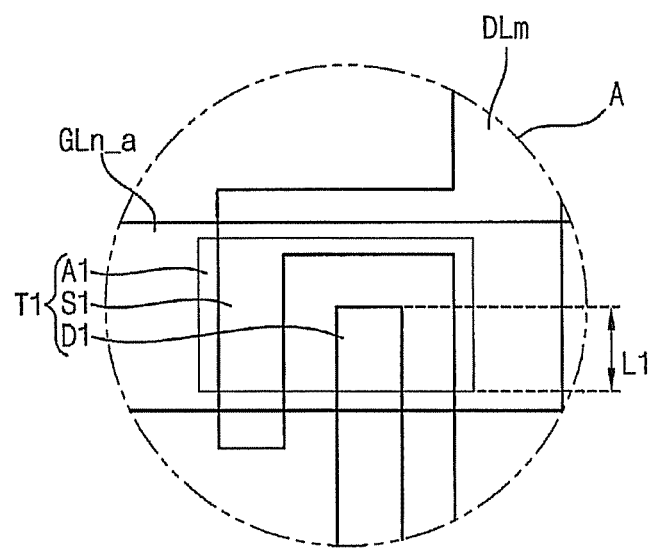
Figure 5B:
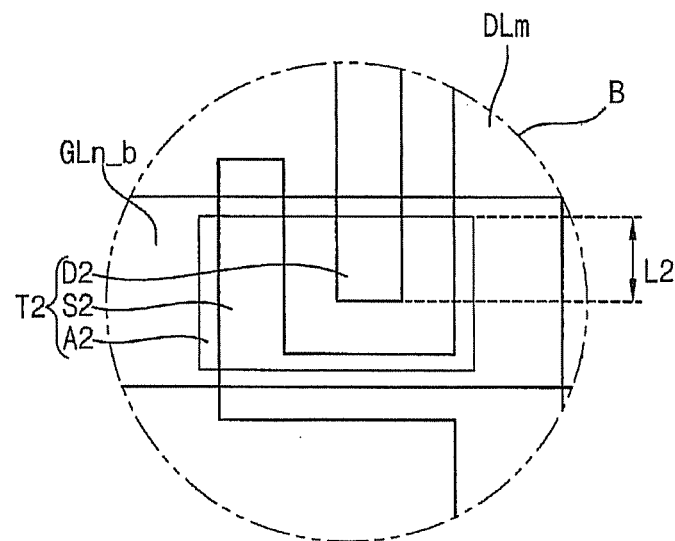
Figure 6A:
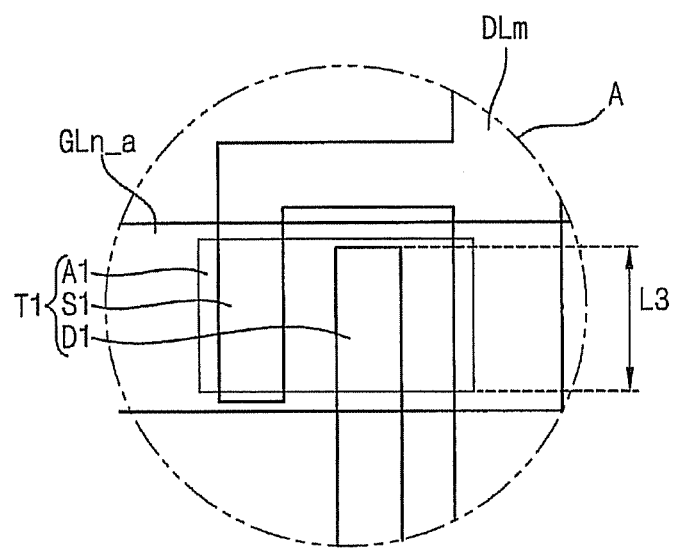
Figure 6B:
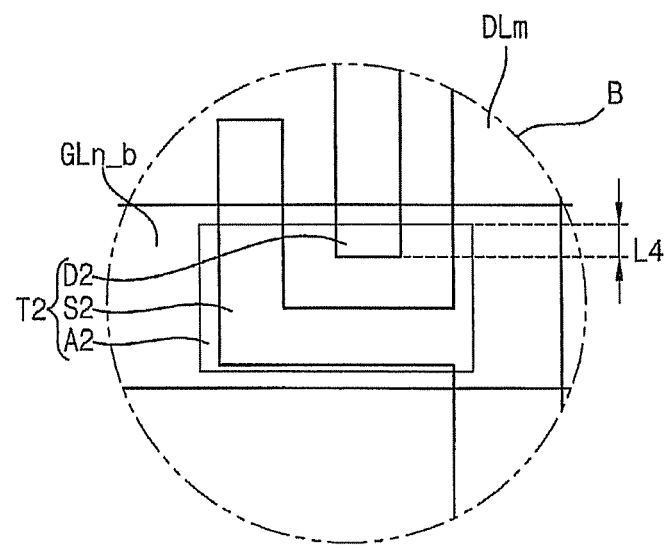
Figure 7A:
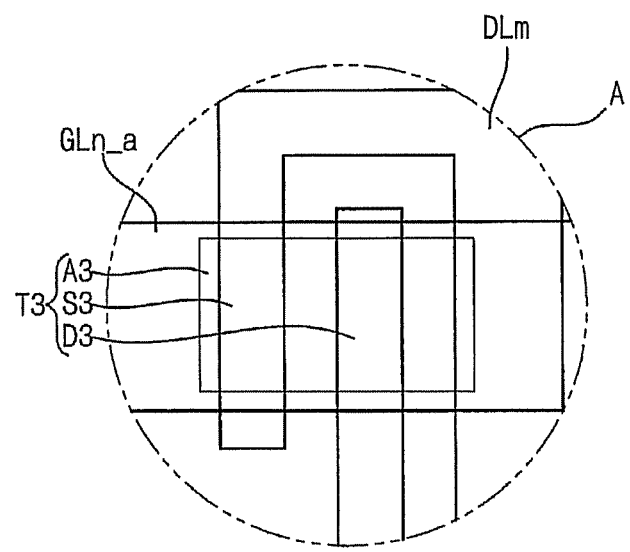
Figure 7B:
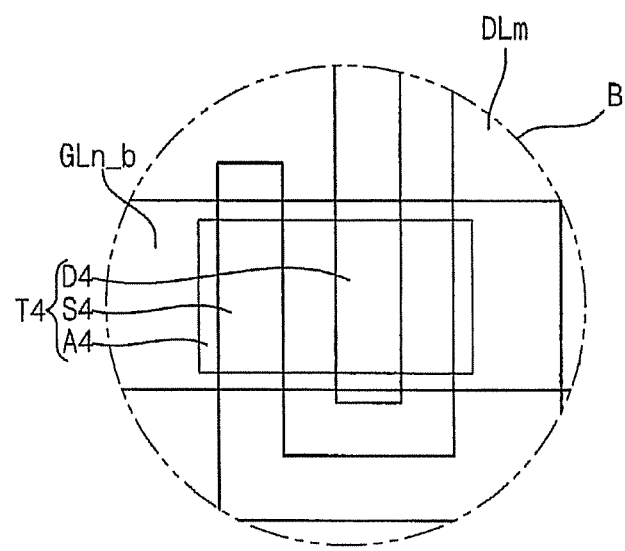
Figure 8:
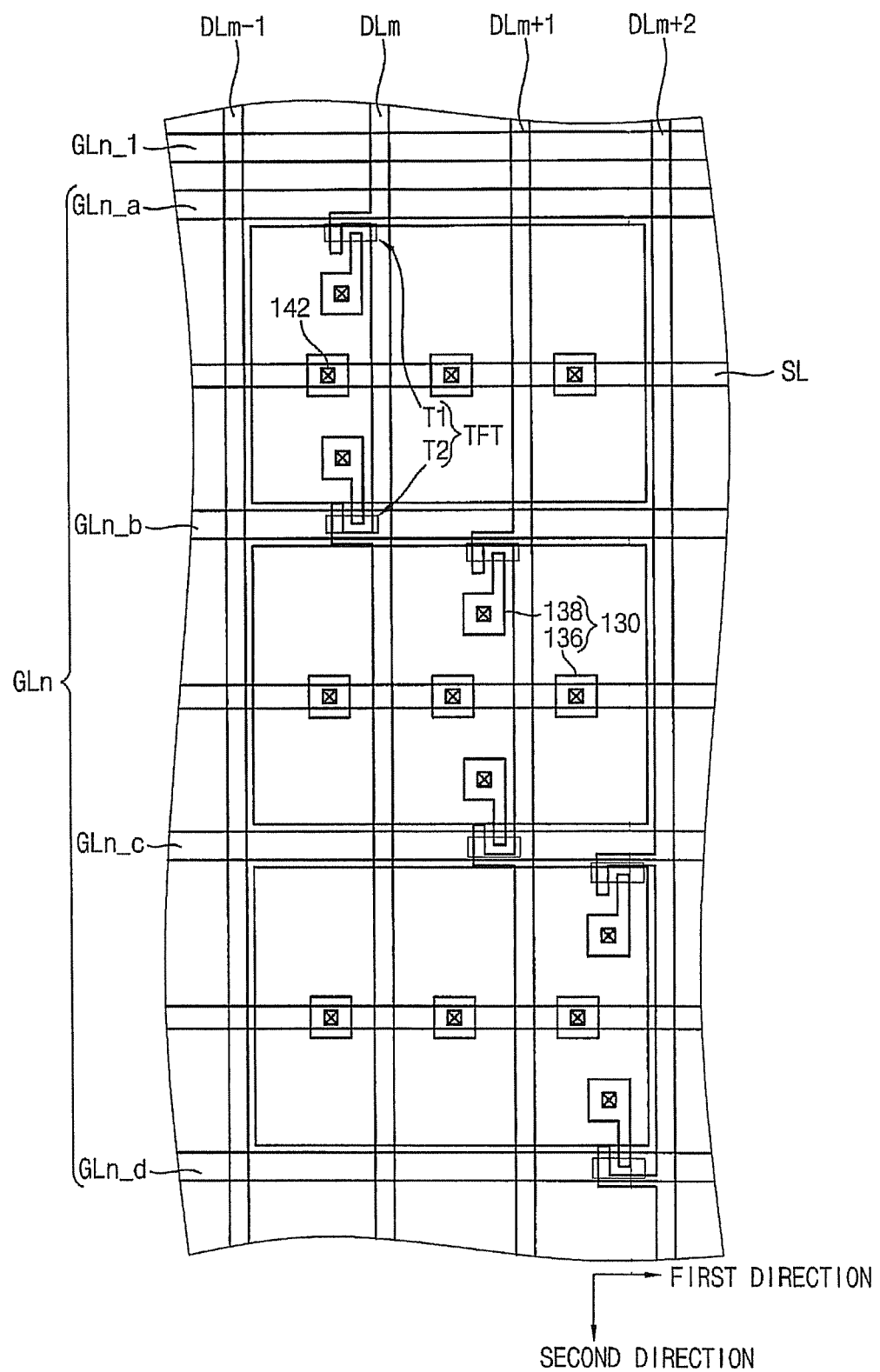
Figure 9:
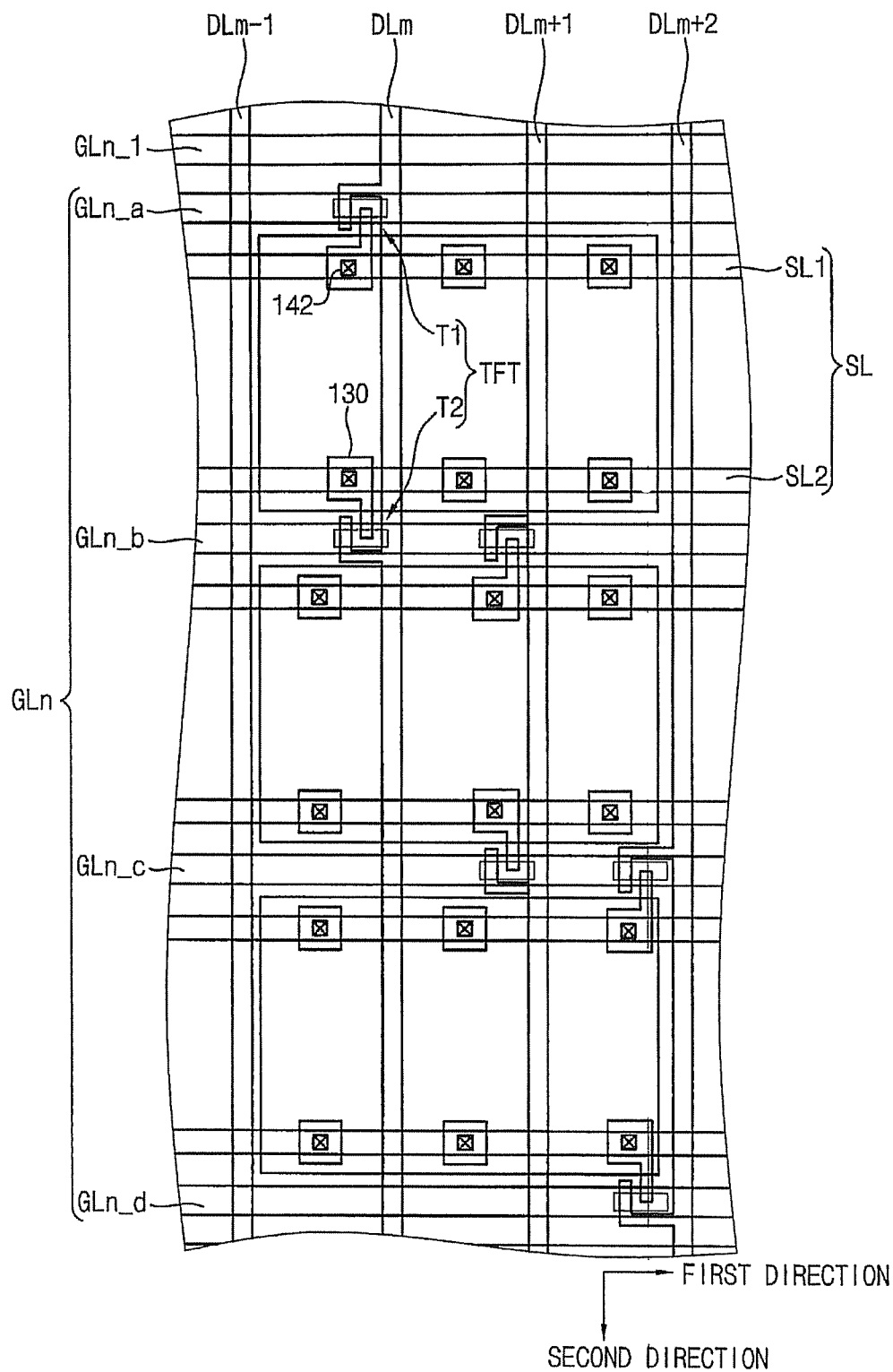

to FIG. 4 is a cross-sectional view taken along line I-I' shown in FIG. 3;

FIG. 5A is a plan view illustrating portion 'A' shown in FIG. 3;

FIG. 5B is a plan view illustrating portion 'B' shown in FIG. 3;

FIGS. 6A and 6B are plan views illustrating exemplary misaligned thin film transistors in accordance with other exemplary embodiments of the present invention;

FIGS. 7A and 7B are plan views illustrating exemplary thin film transistors in accordance with other exemplary embodiments of the present invention;

FIG. 8 is a plan view illustrating an exemplary array substrate of an exemplary display device in accordance with other exemplary embodiments of the present invention; and FIG. 9 is a plan view illustrating an exemplary array substrate of an exemplary display device in accordance with other exemplary embodiments of the present invention.

DETAILED DESCRIPTION OF THE INVENTION

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 1:
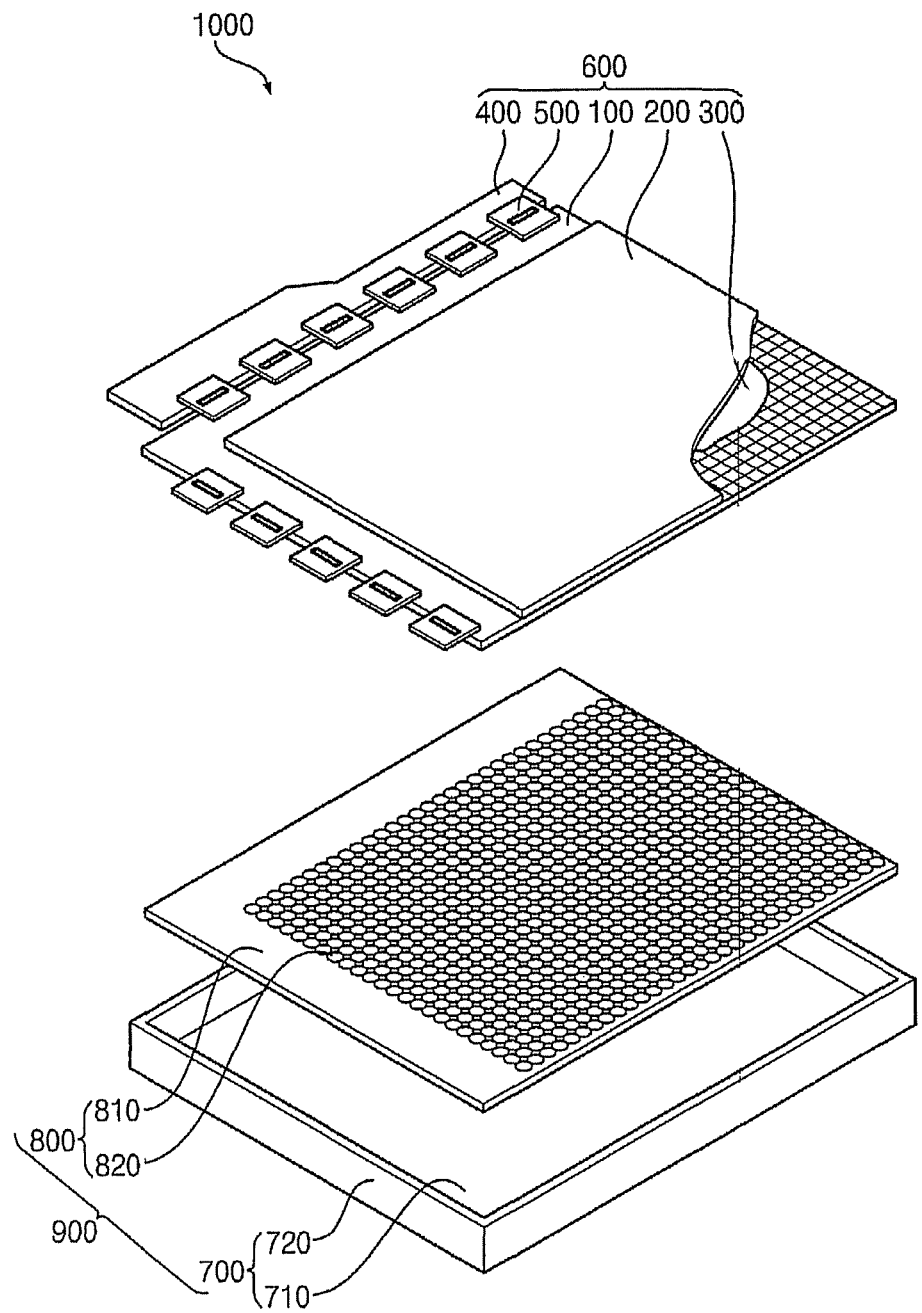
FIG. 1 is an exploded perspective view illustrating an exemplary display device in accordance with an exemplary embodiment of the present invention.

FIG. 1 is an exploded perspective view illustrating an exemplary display device in accordance with an exemplary embodiment of the present invention.

Referring to FIG. 1, the display device 1000 includes a display panel assembly 600 and a backlight assembly 900. The display panel assembly 600 displays an image by using light. The backlight assembly 900 supplies the display panel assembly 600 with the light. Hereinafter, elements of the display device 1000 will be described with reference to FIG. 1, and then a first substrate 100 of the display panel assembly 600 will be further described below.

The display panel assembly 600 includes the first substrate 100, a second substrate 200, a liquid crystal layer 300, a printed circuit board ("PCB") 400, and a flexible circuit board 500.

The first substrate 100 includes a plurality of pixel electrodes, a plurality of thin film transistor members, and a plurality of signal lines. The pixel electrodes are arranged in a matrix shape, and include a transparent conductive material. The thin film transistor members apply driving voltages to the pixel electrodes, respectively. The signal lines transmit the driving voltages to the thin film transistor members.

The second substrate 200 faces the first substrate 100. The second substrate 200 includes a common electrode that is on a substantially entire surface of the second substrate 200. The common electrode includes a transparent conductive material. In FIG. 1, the second substrate 200 does not include color filters that transmit color light.

The liquid crystal layer 300 is interposed between the first substrate 100 and the second substrate 200. Liquid crystals of the liquid crystal layer 300 vary arrangement in response to an electric field applied thereto, and light transmittance of the liquid crystal layer 300 is changed so that an image is displayed using the light generated from the backlight assembly 900.

The PCB 400 includes a driving circuit that processes signals. The driving circuit converts externally provided image signals into control signals to display the image. The PCB 400 may be a single integrated circuit board. Alternatively, the PCB 400 may include a data PCB and a gate PCB. When signal transmission lines are formed on the first substrate 100 and/or a flexible circuit board 500, the gate PCB may be omitted.

The PCB 400 is electrically connected to the first substrate 100 through the flexible circuit board 500. The flexible circuit board 500 transmits the control signals that are generated from the PCB 400 to the first substrate 100. The flexible circuit board 500 may further include a driving chip that converts the control signals into the driving signals to drive the thin film transistor members. For example, the flexible circuit board 500 may be a tape carrier package ("TCP") or a chip on film ("COF"). Alternatively, the driving chip may be formed on the first substrate 100.

The backlight assembly 900 is under the display panel assembly 600 to supply the display panel assembly 600 with the light. The backlight assembly 900 includes a receiving container 700 and a light generating unit 800.

The receiving container 700 includes a bottom plate 710 and a sidewall 720. The sidewall 720 is protruded from sides of the bottom plate 710. The bottom plate 710 and the sidewall 720 define a receiving space in the receiving container 700. The light generating unit 800 is received in the receiving space.

The light generating unit 800 generates the light, and includes a driving substrate 810 and a light emitting diode ("LED") 820.

The driving substrate 810 includes a control line (not shown) to control the LED 820, and a power supply line (not shown) to illuminate the LED 820.

A plurality of LEDs 820 may be arranged on the driving substrate 810. The LED 820 is electrically connected to the control line, and is electrically connected to the power supply line to receive an electric power.

Figure 2:
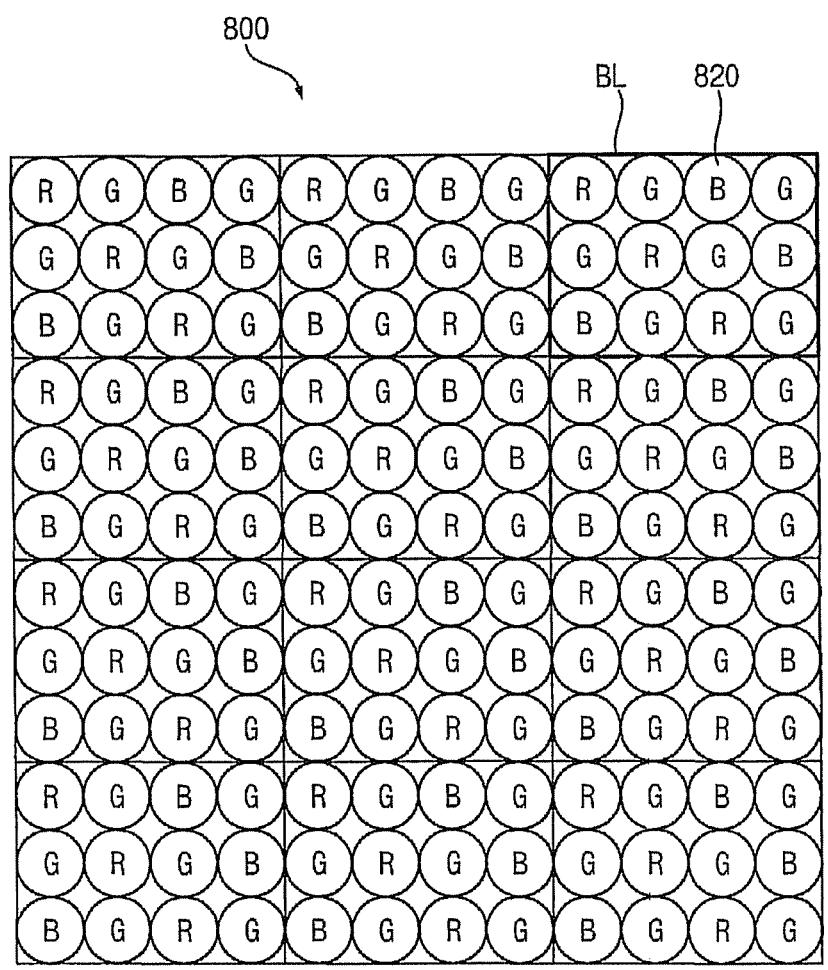
FIG. 2 is a plan view illustrating the exemplary light generating unit shown in FIG. 1.

FIG. 2 is a plan view illustrating the exemplary light generating unit shown in FIG. 1.

Referring to FIG. 2, the light generating unit 800 includes a plurality of LEDs 820 arranged in a matrix shape. The LEDs 820 includes red LEDs R, green LEDs G, and blue LEDs B.

In FIG. 2, the LEDs 820 may be grouped in three columns and four rows to define a plurality of unit blocks BL. The unit blocks BL are arranged in a matrix shape.

For example, a red LED R, a green LED G, a blue LED B and a green LED G are arranged in a first column of each of the unit block BL, in sequence. In addition, a green LED G, a red LED R, a green LED G, and a blue LED B are arranged in a second column of each of the unit block BL, in sequence. In addition, a blue LED B, a green LED G, a red LED R, and a green LED G are arranged in a third column of each of the unit block BL, in sequence. Alternatively, the LEDs may be disposed in various arrangements.

Referring again to FIGS. 1 and 2, an exemplary operation of the display device 1000 will be described hereafter.

The light generating unit 800 of the backlight assembly 900 generates red light, green light, and blue light, in sequence. For example, the red LEDs R generate the red light during a first time period, and then the green LEDs G generate the green light during a second time period. The blue LEDs B then generate the blue light during a third time period. In FIGS. 1 and 2, the time period for generating each of the red, green, and blue lights is about 5.57 ms, and a frequency of illumination of the red, green, and blue lights is about 180 Hz. The time period and frequency may alternatively be adjusted as necessary. The time period may be one third of one frame.

The display panel assembly 600 displays the image using the red, green, and blue lights that are generated, in sequence. For example, the display panel assembly 600 displays a red image, while the red light is generated by the light generating unit 800. The display panel assembly 600 then displays a green image, while the green light is generated by the light generating unit 800. The display panel assembly 600 then displays a blue image, while the blue light is generated by the light generating unit 800. Thus, the display panel assembly 600 displays the red, green, and blue images, in sequence, to display the image of one frame.

Hereinafter, exemplary embodiments of the first substrate 100 is explained in detail with reference to the following drawings.

FIG. 3 is a plan view illustrating the exemplary array substrate shown in FIG. 1. FIG. 4 is a cross-sectional view taken along line I-I' shown in FIG. 3.

Referring to FIGS. 3 and 4, the first substrate 100 includes a transparent insulating substrate 110, a gate line GL, a data line DL, a storage line SL, a thin film transistor member TFT, a gate insulating layer 120, a connecting electrode 130, a passivation layer 140, and a pixel electrode 150. It should be understood that the first substrate 100 may further include a plurality of gate lines GL, a plurality of data lines DL, a plurality of storage lines SL, a plurality of thin film transistor members TFT, a plurality of connecting electrodes 130, and a plurality of pixel electrodes 150.

The transparent substrate 110 is substantially plate shaped, and includes a transparent material. Examples of the transparent material that can be used for the transparent substrate 110 include glass, quartz, sapphire, a synthetic resin, etc.

The gate lines GL are extended lengthwise on the transparent substrate 110 in a first direction, and have a width in a second direction, where the second direction is substantially perpendicular to the first direction. One of the gate lines GL is an n-th gate line GLn, wherein n is a natural number.

Each gate line GL may include a plurality of sub lines. For example, the n-th gate line GLn includes a first sub line GLn_a, a second sub line GLn_b, a third sub line GLn_c, and a fourth sub line GLn_d.

The first, second, third, and fourth sub lines GLn_a, GLn_b, GLn_c, and GLn_d are extended lengthwise on the transparent substrate 110 in the first direction, and have a width in the second direction. The first, second, third, and fourth sub lines GLn_a, GLn_b, GLn_c, and GLn_d are spaced apart from each other by a predetermined distance. The first sub line GLn_a is adjacent to an (n−1)-th gate line GLn−1. The fourth sub line GLn_d is adjacent to an (n+1)-th gate line GLn+1 (not shown).

The first, second, third, and fourth sub lines GLn_a, GLn_b, GLn_c, and GLn_d are electrically connected to each other, and a gate signal is applied to the n-th gate line GLn during a predetermined time period.

The storage lines SL are extended lengthwise on the transparent substrate 110 in the first direction, and have a width in the second direction. The storage lines SL are substantially in parallel with the gate lines GL. The storage lines SL are adjacent to at least some of the sub lines of the gate lines GL, respectively. In FIG. 3, the storage lines SL are adjacent to the second, third, and fourth sub lines GLn_b, GLn_c, and GLn_d, respectively.

The gate insulating layer 120 is disposed on the transparent substrate 110 and covers the gate lines GL and the storage lines SL. For example, the gate insulating layer 120 includes a transparent insulating material such as silicon nitride.

The data lines DL are formed on the gate insulating layer 120. The data lines DL are extended lengthwise in the second direction to cross the gate lines GL, and have a width in the first direction. One of the data lines DL is an m-th data line DLm, wherein m is a natural number.

The data lines DL cross the sub lines of the gate lines GL to define a plurality of sub regions. In addition, three sub regions are arranged in the first direction, a row direction of the first substrate 100, to define a unit pixel. The unit pixel is a minimum unit for displaying the image.

For example, thin film transistor members TFT, each of the pixel electrodes 150, and connecting electrodes 130 are formed on the unit pixel. The pixel electrode 150 is formed on a substantially entire area of the unit pixel. For example, the pixel electrode 150 is formed on the three sub regions of the unit pixel. Each of the thin film transistor members TFT is formed in at least one of the sub regions of each unit pixel. Each of the thin film transistor members TFT includes an upper thin film transistor T1 and a lower thin film transistor T2. The upper and lower thin film transistors T1 and T2 face each other in the second direction in each of the sub regions, and are on opposite end portions of the sub region.

For example, a first thin film transistor member TFT of the thin film transistor members TFT is formed in a left most sub region of the unit pixel between the first sub line GLn_a and the second sub line GLn_b. The upper thin film transistor T1 of the first thin film transistor member TFT is partially overlapped with the first sub line GLn_a, and the lower thin film transistor T2 of the first thin film transistor member TFT is partially overlapped with the second sub line GLn_b.

A second thin film transistor member TFT of the thin film transistor members TFT is formed in a central sub region of the unit pixel between the second sub line GLn_b and the third sub line GLn_c, where the central sub region of the unit pixel is formed to the right of the leftmost sub region of the unit pixel. The upper thin film transistor T1 of the second thin film transistor member TFT is partially overlapped with the second sub line GLn_b, and the lower thin film transistor T2 of the second thin film transistor member TFT is partially overlapped with the third sub line GLn_c.

A third thin film transistor member TFT of the thin film transistor members TFT is formed in a rightmost sub region of the unit pixel between the third sub line GLn_c and the fourth sub line GLn_d. The upper thin film transistor T1 of the third thin film transistor member TFT is partially overlapped with the third sub line GLn_c, and the lower thin film transistor T2 of the third thin film transistor member TFT is partially overlapped with the fourth sub line GLn_d. The thin film transistor members TFT are repetitively arranged on the transparent substrate 110 in the first and second directions.

The connecting electrodes 130 are formed on the gate insulating layer 120, such as within a same layer of the first substrate 100 as the data lines DL. Each of the connecting electrodes 130 is in each of the sub regions. Each of the connecting electrodes 130 includes a first connecting electrode part 132 and a second connecting electrode part 134. The first connecting electrode part 132 corresponds to each of the storage lines SL, and is in each of the sub regions. The second connecting electrode part 134 is in at least one of the sub regions of the unit pixel, and faces the first connecting electrode part 132.

The second connecting electrode 134 is electrically connected to the upper thin film transistor T1, and the first connecting electrode 132 facing the second connecting electrode 134 is electrically connected to the lower thin film transistor T2.

The passivation layer 140 is on a substantially entire surface of the gate insulating layer 120 to cover the thin film transistor members TFT and the connecting electrodes 130. A contact hole 142 is formed on the passivation layer 140. Alternatively, a plurality of contact holes 142 may be formed on the passivation layer 140. The contact holes 142 correspond to the connecting electrodes 130.

The pixel electrodes 150 are formed on the passivation layer 140. Each of the pixel electrodes 150 covers three sub regions adjacent to each other in the first direction. Each of the pixel electrodes 150 is electrically connected to each of the connecting electrodes 130 through each of the contact holes 142 formed in the passivation layer 140.

Each of the connecting electrodes 130 or each of the pixel electrodes 150 is spaced apart from each of the storage lines SL to form a storage capacitor that maintains a voltage difference between each of the pixel electrodes 150 and the common electrode.

Hereinafter, a first thin film transistor member TFT of the thin film transistor members TFT interposed between the first sub line GLn_a and the second sub line GLn_b will be further described. For example, the upper thin film transistor T1 of the thin film transistor member TFT, which is on the first sub line GLn_a and the lower thin film transistor T2 of the thin film transistor member TFT, which is on the second sub line GLn_b will be further described below with reference to the following drawings.

FIG. 5A is a plan view illustrating portion 'A' shown in FIG. 3. FIG. 5B is a plan view illustrating portion 'B' shown in FIG. 3.

Referring to FIG. 5A, the upper thin film transistor T1 includes an upper active layer A1, an upper source electrode S1, and an upper drain electrode D1. A portion of the first sub line GLn_a functions as a gate electrode of the upper thin film transistor T1.

The upper active layer A1 is formed on the gate insulating layer 120 in an area corresponding to the first sub line GLn_a. For example, the upper active layer A1 includes amorphous silicon ("a-Si").

The upper source electrode S1 is extended from the m-th data line DLm to form an L-shape so that the upper source electrode S1 and the m-th data line DLm together form a U-shape. The upper source electrode S1 partially overlaps the upper active layer A1.

The upper drain electrode D1 is extended from a center of the U-shape that is formed by the upper source electrode S1 and the m-th data line DLm. That is, the upper drain electrode D1 is partially surrounded by the upper source electrode S1. The upper drain electrode D1 is electrically connected to the second connecting electrode 134. The upper drain electrode D1 partially overlaps the upper active layer A1, and is spaced apart from the upper source electrode S1. The upper drain electrode D1 partially overlaps the upper active layer A1 in the second direction to define a first overlapping length L1.

An upper ohmic contact layer (not shown) may be formed on the overlapped portion between the upper source electrode S1 and the upper active layer A1 and the overlapped portion between the upper drain electrode D1 and the upper active layer A1. For example, the upper ohmic contact layer may include n+ amorphous silicon ("n+ a-Si"). n+ impurities may be implanted into an a-Si layer at a high concentration to form the n+ a-Si.

Referring to FIG. 5B, and with reference to FIG. 3, the lower thin film transistor T2 is substantially symmetric with the upper thin film transistor T1 with respect to a central line of the sub region, which is substantially in parallel with the first direction. The lower thin film transistor T2 includes a lower active layer A2, a lower source electrode S2, and a lower drain electrode D2. A portion of the second sub line GLn_b functions as a gate electrode of the lower thin film transistor T2.

The lower active layer A2 is formed on the gate insulating layer 120, and in an area corresponding to the second sub line GLn_b. For example, the lower active layer A2 includes a-Si.

The lower source electrode S2 is extended from the m-th data line DLm, and has an L-shape so that the lower source electrode S2 and the m-th data line DLm form a U-shape. The lower source electrode S2 partially overlaps the lower active layer A2.

The lower drain electrode D2 is extended from a center of the U-shape that is formed by the lower source electrode S2 and the m-th data line DLm. The lower drain electrode D2 is partially surrounded by the lower source electrode S2. The lower drain electrode D2 is electrically connected to the first connecting electrode 132. The lower drain electrode D2 partially overlaps the lower active layer A2, and is spaced apart from the lower source electrode S2. The lower drain electrode D2 partially overlaps the lower active layer A2 in the second direction to define a second overlapping length L2.

A lower ohmic contact layer (not shown) may be formed on the overlapped portion between the lower source electrode S2 and the lower active layer A2 and the overlapped portion between the lower drain electrode D2 and the lower active layer A2. For example, the lower ohmic contact layer may include n+ a-Si. n+ impurities may be implanted into an a-Si layer at a high concentration to form the n+ a-Si.

The first sub line GLn_a and the second sub line GLn_b are electrically connected to the upper thin film transistor T1 and the lower thin film transistor T2, respectively. The first sub line GLn_a is electrically connected to the second sub line GLn_b so that the gate signal applied to the upper thin film transistor T1 is substantially the same as the gate signal applied to the lower thin film transistor T2. The upper source electrode S1 of the upper thin film transistor T1 and the lower source electrode S2 of the lower thin film transistor T2 are both electrically connected to the m-th data line DLm so that the upper source electrode S1 of the upper thin film transistor T1 receives substantially the same data signal applied to the lower source electrode S2 of the lower thin film transistor T2.

Therefore, the upper thin film transistor T1 is simultaneously operated with the lower thin film transistor T2 to apply an electric charge to the pixel electrode 150 that is electrically connected to both the upper thin film transistor T1 and the lower thin film transistor T2. For example, the lower thin film transistor T2, that is simultaneously operated with the upper thin film transistor T1, charges the pixel electrode 150 simultaneously with the upper thin film transistor T1, thereby improving a charging rate of the pixel electrode 150. When the charging rate of the pixel electrode 150 is improved, an image display quality is improved.

FIGS. 6A and 6B are plan views illustrating exemplary misaligned thin film transistors in accordance with another exemplary embodiment of the present invention. In FIGS. 6A and 6B, a layer for forming the gate electrodes of the thin film transistors of FIG. 5 is misaligned with respect to a layer for forming the source/drain electrodes of the thin film transistors in a direction opposite to the second direction by a predetermined distance.

Referring to FIG. 6A, a misaligned upper drain electrode D1 partially overlaps an upper active layer A1 by a third overlapping length L3. The third overlapping length L3 is greater than the first overlapping length L1 (shown in FIG. 5A).

A misaligned lower drain electrode D2 partially overlaps a lower active layer A2 by a fourth overlapping length L4. The fourth overlapping length L4 is smaller than the second overlapping length L2 (shown in FIG. 5B). Thus, the fourth overlapping length L4 is smaller than the third overlapping length L3.

In FIGS. 5A to 6B, the upper thin film transistor T1 and the second thin film transistor T2 are symmetrically arranged with respect to a central line of the sub region in the first direction. Thus, a summation of the first overlapping length L1 and the second overlapping length L2 without misalignment is substantially the same as a summation of the third overlapping length L3 and the fourth overlapping length L4 with misalignment.

When the upper thin film transistor T1 and the second thin film transistor T2 are symmetrically arranged, a summation of a capacitance between the upper drain electrode D1 and the first sub line GLn_a and a capacitance between the lower drain electrode D2 and the second sub line GLn_b is not changed, even if the thin film transistors are misaligned. Thus, a kick back voltage is not changed to improve the image display quality. The kick back voltage corresponds to a voltage variation caused by an application of the gate signal to the lower and upper gate electrodes, from the first and second sub lines GLn_a and GLn_b, of the upper and lower thin film transistors T1 and T2.

FIGS. 7A and 7B are plan views illustrating exemplary thin film transistors in accordance with another exemplary embodiment of the present invention. A display device having the thin film transistors shown in FIGS. 7A and 7B is substantially the same as the display device shown in FIGS. 1 to 5B except for the thin film transistors. Thus, the same reference numerals will be used to refer to the same or like parts as those described in FIGS. 1 to 5B and any further explanation concerning the above elements will be omitted.

The thin film transistor member TFT includes an upper thin film transistor T3 and a lower thin film transistor T4.

Referring to FIG. 7A, the upper thin film transistor T3 includes an upper active layer A3, an upper source electrode S3, and an upper drain electrode D3. A first sub line GLn_a functions as an upper gate electrode of the upper thin film transistor T3.

The upper active layer A3 is formed on a gate insulating layer 120, and within an area corresponding to the first sub line GLn_a.

The upper source electrode S3 is extended from an m-th data line DLm, and has an L-shape. The upper source electrode S3 and the m-th data line DLm form a U-shape. The upper source electrode S3 partially overlaps the upper active layer A3.

The upper drain electrode D3 is extended from a center of the U-shape that is formed by the upper source electrode S3 and the m-th data line DLm in a second direction (shown in FIG. 3). The upper drain electrode D3 is thus partially surrounded by the upper source electrode S3. The upper drain electrode D3 is electrically connected to the second connecting electrode 134. The upper drain electrode D3 partially overlaps the upper active layer A3, and is spaced apart from the upper source electrode S3 by a predetermined distance.

Referring to FIG. 7B, the lower thin film transistor T4 and the upper thin film transistor T3 are substantially symmetric with respect to a central line of the sub region in the first direction. The lower thin film transistor T4 includes a lower active layer A4, a lower source electrode S4, and a lower drain electrode D4. A second sub line GLn_b functions as a lower gate electrode of the lower thin film transistor T4.

The lower active layer A4 is formed on the gate insulating layer 120, and within an area corresponding to the second sub line GLn_b.

The lower source electrode S4 is extended from the m-th data line DLm, and has an L-shape. The lower source electrode S4 and the m-th data line DLm form a U-shape. The lower source electrode S4 partially overlaps the lower active layer A4.

The lower drain electrode D4 is extended from a center of the U-shape that is formed by the lower source electrode S4 and the m-th data line DLm in the second direction. The lower drain electrode D4 is thus partially surrounded by the lower source electrode S4. The lower drain electrode D4 is electrically connected to the first connecting electrode 132. The lower drain electrode D4 partially overlaps the lower active layer A4, and is spaced apart from the lower source electrode S4 by a predetermined distance.

In FIGS. 7A and 7B, the upper drain electrode D3 crosses the upper active layer A3, and the lower drain electrode D4 crosses the lower active layer A4. That is, the upper drain electrode D3 crosses an entire width of the upper active layer A3 in the second direction, and the lower drain electrode D4 crosses an entire width of the lower active layer A4 in the second direction. When the widths of the upper active layer A3 and the lower active layer A4 are the same, the overlapping length of the upper thin film transistor T3 is the same as the overlapping length of the lower thin film transistor T4. Thus, a capacitance between the upper drain electrode D3 and the first sub line GLn_a and a capacitance between the lower drain electrode D4 and the second sub line GLn_b are uniform, even if a layer of the upper and lower gate electrodes of the upper and lower thin film transistors T3 and T4 is misaligned with a layer of the upper and lower source/drain electrodes of the upper and lower thin film transistors T3 and T4.

FIG. 8 is a plan view illustrating an exemplary array substrate of an exemplary display device in accordance with another exemplary embodiment of the present invention. The display device shown in FIG. 8 is substantially the same as the display device shown in FIGS. 1 to 5B except for an array substrate. Thus, the same reference numerals will be used to refer to the same or like parts as those described in FIGS. 1 to 5B and any further explanation concerning the above elements will be omitted.

Referring to FIGS. 4 and 8, a first substrate 100 includes a transparent substrate 110, a gate line GL, a data line DL, a storage line SL, a thin film transistor member TFT, a gate insulating layer 120, a connecting electrode 130, a passivation layer 140, and a pixel electrode 150. As illustrated in FIG. 8, the first substrate may further include a plurality of gate lines GL, a plurality of data lines DL, a plurality of storage lines SL, a plurality of thin film transistor members TFT, and a plurality of pixel electrodes 150.

The transparent substrate 110 is substantially plate shaped, and includes a transparent material.

The gate lines GL are extended lengthwise on the transparent substrate 110 in a first direction, and have a width in a second direction that is substantially in perpendicular to the first direction. One of the gate lines GL is an n-th gate line GLn, wherein n is a natural number.

Each gate line GL includes a plurality of sub lines. For example, the n-th gate line includes a first sub line GLn_a, a second sub line GLn_b, a third sub line GLn_c, and a fourth sub line GLn_d. The first, second, third, and fourth sub lines GLn_a, GLn_b, GLn_c, and GLn_d are electrically connected to each other, and a gate signal is simultaneously applied to the first, second, third, and fourth sub lines GLn_a, GLn_b, GLn_c and GLn_d during a predetermined time period.

The storage lines SL are extended lengthwise on the transparent substrate 110 in the first direction, and have a width in the second direction. The storage lines SL are substantially parallel with the gate lines GL. The storage lines SL are adjacent to the sub lines of the gate lines GL, respectively. In FIG. 8, a storage lines SL is disposed on a central portion between the first and second sub lines GLn_a and GLn_b, a central portion between the second and third sub lines GLn_b and GLn_c, and a central portion between the third and fourth sub lines GLn_c and GLn_d.

The gate insulating layer 120 is disposed on the transparent substrate 110 to cover the gate lines GL and the storage lines SL.

The data lines DL are formed on the gate insulating layer 120. The data lines DL are extended lengthwise in the second direction to cross the gate lines GL, and have a width in the first direction. One of the data lines DL is an m-th data line DLm, wherein m is a natural number. The data lines DL cross the sub lines of the gate lines GL to define a plurality of sub regions. In addition, three sub regions arranged in the first direction define a unit pixel.

For example, thin film transistor members TFT, the pixel electrode 150, and the connecting electrodes 130 are formed on the unit pixel. The pixel electrode 150 is formed on substantially an entire area of the unit pixel. For example, the pixel electrode 150 is formed on the three sub regions of the unit pixel. Each of the thin film transistor members TFT is formed in at least one of the sub regions of each unit pixel. Each of the thin film transistor members TFT includes an upper thin film transistor T1 and a lower thin film transistor T2. The upper and lower thin film transistors T1 and T2 face each other in the second direction in each of the sub regions, and are on opposite end portions of the sub region.

The connecting electrodes 130 are formed on the gate insulating layer 120. The connecting electrodes 130 may be formed in each of the sub regions. Each of the connecting electrodes 130 includes a first connecting electrode part 136 and two second connecting electrode parts 138.

The first connecting electrode part 136 corresponds to each of the storage lines SL, and is in each of the sub regions. The first connecting electrode part 136 is on the central portion between two adjacent sub lines. The first connecting electrode part 136 is not directly connected to the upper thin film transistor T1 or the lower thin film transistor T2. For example, the first connecting electrode part 136 is indirectly connected to the upper and lower thin film transistors T1 and T2 through the pixel electrode 150.

In FIG. 8, the second connecting electrode parts 138 are in the sub region containing the upper and lower thin film transistors T1 and T2. The second connecting electrode parts 138 are on opposite end portions of the sub region in the second direction. A first part of the second connecting electrode parts 138, which is on an upper portion of the sub region, is electrically connected to the upper thin film transistor T1, and a second part of the second connecting electrode parts 138, which is on a lower portion of the sub region, is electrically connected to the lower thin film transistor T2.

The passivation layer 140 is on a substantially entire surface of the gate insulating layer 120 to cover the thin film transistor members TFT and the connecting electrodes 130. A contact hole 142 is formed through the passivation layer 140. Alternatively, a plurality of contact holes 142 may be formed through the passivation layer 140. The contact holes 142 correspond to the first and second connecting electrode parts 136 and 138.

The pixel electrodes 150 are formed on the passivation layer 140. Each of the pixel electrodes 150 covers three sub regions of a unit pixel. Each of the pixel electrodes 150 is electrically connected to each of the connecting electrodes 130 through each of the contact holes 142 formed in the passivation layer 140. Thus, the first and second connecting electrode parts 136 and 138 are electrically connected to each other through the pixel electrode 150 in each of the unit pixels.

FIG. 9 is a plan view illustrating an exemplary array substrate of an exemplary display device in accordance with another exemplary embodiment of the present invention. The display device shown in FIG. 9 is substantially the same as the display device shown in FIGS. 1 to 5B except for an array substrate. Thus, the same reference numerals will be used to refer to the same or like parts as those described in FIGS. 1 to 5B and any further explanation concerning the above elements will be omitted.

Referring to FIGS. 4 and 9, a first substrate 100 includes a transparent substrate 110, a gate line GL, a data line DL, a storage line SL, a thin film transistor member TFT, a gate insulating layer 120, a connecting electrode 130, a passivation layer 140, and a pixel electrode 150. It should be understood that the first substrate may further include a plurality of gate lines GL, a plurality of data lines DL, a plurality of storage lines SL, a plurality of thin film transistor members TFT, and a plurality of pixel electrodes 150.

The transparent substrate 110 is substantially plate shaped, and includes a transparent material.

The gate lines GL are extended lengthwise on the transparent substrate 110 in a first direction, and have a width in a second direction that is substantially in perpendicular to the first direction. One of the gate lines GL is an n-th gate line GLn, wherein n is a natural number.

Each gate line GL includes a plurality of sub lines. For example, the n-th gate line GLn includes a first sub line GLn_a, a second sub line GLn_b, a third sub line GLn_c, and a fourth sub line GLn_d. The first, second, third, and fourth sub lines GLn_a, GLn_b, GLn_c, and GLn_d are electrically connected to each other, and a gate signal is simultaneously applied to the first, second, third, and fourth sub lines GLn_a, GLn_b, GLn_c, and GLn_d during a predetermined time period.

The storage lines SL are extended lengthwise on the transparent substrate 110 in the first direction, and have a width in the second direction. The storage lines SL are substantially parallel to the gate lines GL. Two storage lines SL are formed between each adjacent pair of sub lines. The storage lines SL between the adjacent sub lines are adjacent to the adjacent sub lines, respectively. A first storage line of the two storage lines SL is an upper storage line SL1, and a second storage line of the two storage lines SL is a lower storage line SL2.

For example, the upper and lower storage lines SL1 and SL2 are interposed between the first and second sub lines GLn_a and GLn_b. A first upper storage line SL1 of the upper storage lines SL1 is adjacent to the first sub line GLn_a, and a first lower storage line SL2 of the lower storage lines SL2 is adjacent to the second sub line GLn_b.

A second upper storage line SL1 of the upper storage lines SL1 and a second lower storage line SL2 of the lower storage lines SL2 are interposed between the second and third sub lines GLn_b and GLn_c. The second upper storage line SL1 of the upper storage lines SL1 is adjacent to the second sub line GLn_b, and the second lower storage line SL2 of the lower storage lines SL2 is adjacent to the third sub line GLn_c.

A third upper storage line SL1 of the upper storage lines SL1 and a third lower storage line SL2 of the lower storage lines SL2 are interposed between the third and fourth sub lines GLn_c and GLn_d. The third upper storage line SL1 of the upper storage lines SL1 is adjacent to the third sub line GLn_c, and the third lower storage line SL2 of the lower storage lines SL2 is adjacent to the fourth sub line GLn_d.

The gate insulating layer 120 is formed on the transparent substrate 110 and covers the gate lines GL and the storage lines SL.

The data lines DL are formed on the gate insulating layer 120. The data lines DL are extended lengthwise in the second direction to cross the gate lines GL, and have a width in the first direction. One of the data lines DL is an m-th data line DLm, wherein m is a natural number. The data lines DL cross the sub lines of the gate lines GL to define a plurality of sub regions. In addition, three sub regions arranged in the first direction define a unit pixel.

For example, thin film transistor members TFT, the pixel electrode 150, and connecting electrodes 130 are formed on the unit pixel. The pixel electrode 150 is formed on substantially an entire area of the unit pixel. For example, the pixel electrode 150 is formed on the three sub regions of the unit pixel. Each of the thin film transistor members TFT is formed in at least one of the sub regions. Each of the thin film transistor members TFT includes an upper thin film transistor T1 and a lower thin film transistor T2. The upper and lower thin film transistors T1 and T2 face each other in the second direction in the sub regions, and are on opposite end portions of the sub region.

The connecting electrodes 130 are formed on the gate insulating layer 120. Two connecting electrodes 130 are in each of the sub regions, and correspond to the two storage lines in each of the sub regions. Within at least one of the sub regions, a first connecting electrode of the two connecting electrodes 130, which is on an upper portion of the sub region, is electrically connected to the upper thin film transistor T1, and a second connecting electrode of the two connecting electrodes 130, which is on a lower portion of the sub region, is electrically connected to the lower thin film transistor T2. Within the sub regions that do not include the thin film transistor members TFT, the connecting electrodes 130 overlap the storage lines SL but are not directly connected to the thin film transistor members TFT. Instead, these connecting electrodes 130 are connected to the pixel electrode 150, which is connected to the thin film transistor members TFT in the sub region that includes the thin film transistor members TFT.

The passivation layer 140 is on a substantially entire surface of the gate insulating layer 120 to cover the thin film transistor members TFT and the connecting electrodes 130. A contact hole 142 is formed through the passivation layer 140. Alternatively, a plurality of contact holes 142 may be formed through the passivation layer 140. The contact holes 142 correspond to the connecting electrodes 130.

The pixel electrodes 150 are formed on the passivation layer 140. Each of the pixel electrodes 150 covers the three sub regions of a unit pixel. Each of the pixel electrodes 150 is electrically connected to each of the connecting electrodes 130 through each of the contact holes 142 formed in the passivation layer 140.

A method of improving an image display quality of the above-described display devices is thus made possible, and may include providing a gate line with first and second sub lines electrically connected to each other, crossing the first and second sub lines with a data line, providing a pixel electrode between the first and second sub lines, electrically connecting a first thin film transistor to the first sub line, the pixel electrode, and the data line, electrically connecting a second thin film transistor to the second sub line, the pixel electrode, and the data line, applying a gate signal to the first and second sub lines to simultaneously turn on the first and second thin film transistors, applying a data signal to the data line, and charging the pixel electrode simultaneously with the first and second thin film transistors.

According to the present invention, the upper and lower thin film transistors that are formed in the sub regions are simultaneously driven to simultaneously charge the pixel electrode. Thus, the charging rate of the pixel electrode is increased, and the image display quality is improved.

In addition, the upper and lower thin film transistors form the symmetric shape so that the summation of the capacitance between the upper drain electrode and the sub line and the capacitance between the lower drain electrode and the sub line is uniform, even if the layer of the upper and lower gate electrodes is misaligned from the layer of the upper and lower source/drain electrodes. Thus, the kickback voltage of the upper and lower thin film transistors is uniform, thereby improving the image display quality.

This invention has been described with reference to the exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. An array substrate comprising:
   a gate line including a plurality of sub lines receiving a same gate signal;
   a plurality of data lines crossing the gate line;
   a plurality of pixel electrodes, each of the pixel electrodes being disposed between two adjacent sub lines;
   a first thin film transistor electrically connected to a first sub line, a first pixel electrode, and a first data line;
   a second thin film transistor electrically connected to a second sub line, the first pixel electrode, and the first data line;
   a third thin film transistor electrically connected to the second sub line, a second pixel electrode, and a second data line;
   a fourth thin film transistor electrically connected to a third sub line, the second pixel electrode, and the second data line;
   a fifth thin film transistor electrically connected to the third sub line, a third pixel electrode, and a third data line; and
   a sixth thin film transistor electrically connected to a fourth sub line, the third pixel electrode, and the third data line,
   wherein
   the first and second thin film transistors each connected to the first pixel electrode and the first data line are simultaneously driven to increase a charging rate of the first pixel electrode,
   the third and forth thin film transistors each connected to the second pixel electrode and the second data line are simultaneously driven to increase a charging rate of the second pixel electrode, and
   the fifth and sixth thin film transistors each connected to the third pixel electrode and the third data line are simultaneously driven to increase a charging rate of the third pixel electrode.

2. The array substrate of claim 1, further comprising a plurality of data lines crossing the sub lines to define a plurality of sub regions,
   wherein the pixel electrode covers three sub regions arranged in a longitudinal direction of the plurality of gate lines.

3. The array substrate of claim 1, further comprising storage lines between at least one pair of adjacent sub lines, wherein the storage lines are formed from a substantially same layer as the sub lines and are formed substantially in parallel with the sub lines.

4. The array substrate of claim 3, further comprising a passivation layer disposed between the pixel electrode and the first, second, third, fourth, fifth and sixth thin film transistors.

5. The array substrate of claim 4, further comprising a connecting electrode under the passivation layer in each of the sub regions, wherein the connecting electrode is electrically connected to the pixel electrode through a contact hole in the passivation layer.

6. The array substrate of claim 5, wherein the storage lines are adjacent to one of the sub lines.

7. The array substrate of claim 6, wherein the first connecting electrode comprises
   a first connecting electrode part in each of the sub regions corresponding to the storage line, the first connecting electrode part electrically connected to the first thin film transistor in at least one of the sub regions;
   a second connecting electrode part facing the first connecting electrode, the second connecting electrode part electrically connected to the second thin film transistor in at least one of the sub regions,
   wherein the second connecting electrode comprises a third connecting electrode part in each of the sub regions corresponding to the storage line, the third connecting electrode part electrically connected to the third thin film transistor in at least one of the sub regions, and a fourth connecting electrode part facing the third connecting electrode, the fourth connecting electrode part electrically connected to the fourth thin film transistor in at least one of the sub regions,
   wherein the third connecting electrode comprises a fifth connecting electrode part in each of the sub regions corresponding to the storage line, the fifth connecting electrode part electrically connected to the fifth thin film transistor in at least one of the sub regions, and a sixth connecting electrode part facing the fifth connecting electrode, the sixth connecting electrode part electrically connected to the sixth thin film transistor in at least one of the sub regions.

8. The array substrate of claim 5, wherein the storage lines are on central portions between the adjacent sub lines.

9. The array substrate of claim 8, wherein each of the connecting electrodes comprises:
   a first connecting electrode part in each of the sub regions corresponding to the storage line; and two second connecting electrode parts in at least one of the sub regions, the second connecting electrode parts electrically connected to the first and second thin film transistors.

10. The array substrate of claim 5, further comprising four storage lines between adjacent sub lines, wherein the storage lines are adjacent to the adjacent sub lines, respectively.

11. The array substrate of claim 10, further comprising two connecting electrodes corresponding to the two storage lines in each of the sub regions,
wherein the connecting electrodes are electrically connected to the first, second, third and fourth thin film transistors, respectively.

12. The array substrate of claim 5, wherein the first and second thin film transistors are substantially symmetric with respect to a central line between adjacent sub lines.

13. The array substrate of claim 12, wherein the first thin film transistor comprises:
a first active layer on a first sub line of the sub lines;
a first source electrode extended from the data line and partially overlapping the first active layer; and
a first drain electrode spaced apart from the first source electrode by a predetermined distance and partially overlapping the first active layer, the first drain electrode extended in a longitudinal direction of the data line and electrically connected to a first connecting electrode part of connecting electrode parts of the connecting electrode, and
the second thin film transistor comprises:
a second active layer on a second sub line of the sub lines;
a second source electrode extended from the data line and partially overlapping the second active layer; and
a second drain electrode spaced apart from the second source electrode by a predetermined distance and partially overlapping the second active layer, the second drain electrode extended in a direction opposite to the longitudinal direction of the data line and electrically connected to a second connecting electrode part of the connecting electrode parts of the connecting electrode.

14. The array substrate of claim 13, wherein the first drain electrode crosses the first active layer, and the second drain electrode crosses the second active layer.

15. The array substrate of claim 1, wherein the first thin film transistor and the second thin film transistor receive a substantially same data signal from the data line and simultaneously charge the pixel electrode.

16. A display panel comprising:
a first substrate including:
a gate line including a plurality of sub lines receiving a same gate signal;
a plurality of data lines crossing the gate line;
a first plurality of pixel electrodes, each of the pixel electrodes being disposed between two adjacent sub lines;
a first thin film transistor electrically connected to a first sub line of the two adjacent sub lines, the a first pixel electrode, and the a first data line;
a second thin film transistor electrically connected to a second sub line of the two adjacent sub lines, the first pixel electrode, and the first data line;
a third thin film transistor electrically connected to the second sub line, a second pixel electrode, and a second data line;
a fourth thin film transistor electrically connected to a third sub line, the second pixel electrode, and the second data line;
a fifth thin film transistor electrically connected to the third sub line, a third pixel electrode, and a third data line; and
a sixth thin film transistor electrically connected to a fourth sub line, the third pixel electrode, and the third data line;
a second substrate facing the first substrate, the second substrate including a common electrode; and
a liquid crystal layer including liquid crystals interposed between the first and second substrates,
wherein
the first and second thin film transistors each connected to the first pixel electrode and the first data line are simultaneously driven to increase a charging rate of the first pixel electrode,
the third and forth thin film transistors each connected to the second pixel electrode and the second data line are simultaneously driven to increase a charging rate of the second pixel electrode, and
the fifth and sixth thin film transistors each connected to the third pixel electrode and the third data line are simultaneously driven to increase a charging rate of the third pixel electrode.

17. A display device comprising:
a display panel including:
a first substrate including:
a gate line including a gate line including a plurality of sub lines receiving a same gate signal, a plurality of data lines crossing the gate line;
a plurality of pixel electrodes, each of the pixel electrodes being disposed between two adjacent sub lines,
a first thin film transistor electrically connected to a first sub line of the two adjacent sub lines, the a first pixel electrode, and the a first data line,
a second thin film transistor electrically connected to a second sub line of the two adjacent sub lines, the first pixel electrode, and the first data line,
a third thin film transistor electrically connected to the second sub line, a second pixel electrode, and a second data line,
a fourth thin film transistor electrically connected to a third sub line, the second pixel electrode, and the second data line,
a fifth thin film transistor electrically connected to the third sub line, a third pixel electrode, and a third data line; and
a sixth thin film transistor electrically connected to a fourth sub line, the third pixel electrode, and the third data line;
a second substrate facing the first substrate, the second substrate including a common electrode; and
a liquid crystal layer including liquid crystals interposed between the first and second substrates; and
a backlight assembly under the display panel and supplying the display panel with light,
wherein
the first and second thin film transistors each connected to the first pixel electrode and the first data line are simultaneously driven to increase a charging rate of the first pixel electrode,
the third and fourth thin film transistors each connected to the second pixel electrode and the second data line are simultaneously driven to increase a charging rate of the second pixel electrode, and the fifth and sixth thin film transistors each connected to the third pixel electrode and the third data line are simultaneously driven to increase a charging rate of the third pixel electrode.

18. The display device of claim 17, wherein the backlight assembly comprises:
   a receiving container including a bottom plate and a sidewall defining a receiving space; and
   a light generating unit in the receiving space, the light generating unit including:
   a driving substrate generating a driving voltage; and
   a light emitting diode on the driving substrate generating the light based on the driving voltage.

19. The display device of claim 18, wherein the light emitting diode comprises a red light emitting diode generating red light, a green light emitting diode generating green light, and a blue light emitting diode generating blue light.

20. The display device of claim 19, wherein the red, green, and blue light emitting diodes generate the red, green, and blue lights in sequence.

21. The display device of claim 20, wherein a frequency of each of the red, green, and blue light emitting diodes is about 180 Hz.

22. A method of improving an image display quality of a display device, the method comprising: increasing a charging rate of a first pixel electrode by simultaneously driving the first pixel electrode with first and second thin film transistors each connected to the first pixel electrode and a first data line, wherein the gate lines of the first and second transistors are electrically connected; increasing a charging rate of a second pixel electrode by simultaneously driving the second pixel electrode with third and forth thin film transistors each connected to the second pixel electrode and a second data line, wherein the gate lines of the third and forth transistors are electrically connected; and increasing a charging rate of a third pixel electrode by simultaneously driving the third pixel electrode with fifth and sixth thin film transistors each connected to the third pixel electrode and a third data line, wherein the gate lines of the fifth and sixth transistors are electrically connected.

23. The method of claim 22, further comprising providing a gate line with first and second sub lines electrically connected to each other;
   crossing the first, second, third and fourth sub lines with a data line;
   providing the pixel electrodes;
   electrically connecting the first thin film transistor to the first sub line;
   electrically connecting the second thin film transistor to the second sub line;
   electrically connecting the third thin film transistor to the third sub line;
   electrically connecting the fourth thin film transistor to the fourth sub line;
   electrically connecting the fifth thin film transistor to the fifth sub line;
   electrically connecting the sixth thin film transistor to the sixth sub line;
   applying a same gate signal to the first and second sub lines to simultaneously turn on the first and second thin film transistors; and
   applying a data signal to the data line to simultaneously charge the pixel electrode with the first and second thin film transistors.

* * * * *